(12) United States Patent
Yoshino

(10) Patent No.: US 8,294,978 B2
(45) Date of Patent: Oct. 23, 2012

(54) WAVELENGTH CONVERSION DEVICES AND A METHOD OF PRODUCING THE SAME

(75) Inventor: Takashi Yoshino, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 190 days.

(21) Appl. No.: 12/709,754

(22) Filed: Feb. 22, 2010

(65) Prior Publication Data

US 2010/0226001 A1    Sep. 9, 2010

(30) Foreign Application Priority Data

Mar. 5, 2009 (JP) ................................. 2009-051527

(51) Int. Cl.
 *G02F 1/355* (2006.01)
 *G02F 1/35* (2006.01)
 *G02F 2/02* (2006.01)
(52) U.S. Cl. ........... 359/326; 359/328; 359/332; 372/22
(58) Field of Classification Search .......... 359/326–332; 385/122, 129–132; 372/21, 22
See application file for complete search history.

(56) References Cited

U.S. PATENT DOCUMENTS

| | | | | |
|---|---|---|---|---|
| 5,424,867 A | * | 6/1995 | Nihei et al. | 359/326 |
| 5,875,053 A | * | 2/1999 | Webjorn et al. | 359/326 |
| 6,631,231 B2 | * | 10/2003 | Mizuuchi et al. | 385/122 |
| 7,916,383 B2 | * | 3/2011 | Yoshino | 359/326 |
| 2005/0284359 A1 | | 12/2005 | Hotta et al. | |
| 2006/0001948 A1 | | 1/2006 | Noda et al. | |
| 2006/0109542 A1 | * | 5/2006 | Mizuuchi et al. | 359/330 |
| 2006/0120415 A1 | | 6/2006 | Iwai et al. | |
| 2007/0189689 A1 | | 8/2007 | Yamaguchi et al. | |
| 2007/0223081 A1 | * | 9/2007 | Yoshino et al. | 359/326 |
| 2009/0230817 A1 | | 9/2009 | Kurachi et al. | |
| 2009/0231680 A1 | | 9/2009 | Yoshino | |

FOREIGN PATENT DOCUMENTS

| | | |
|---|---|---|
| JP | 2004-254114 A1 | 9/2004 |
| JP | 2004-295088 A1 | 10/2004 |
| JP | 2005-055528 A1 | 3/2005 |
| JP | 2005-314137 A1 | 11/2005 |
| JP | 2007-241078 A1 | 9/2007 |
| JP | 2008-065140 A1 | 3/2008 |
| JP | 2008-102228 A1 | 5/2008 |
| JP | 2008-224972 A1 | 9/2008 |

(Continued)

OTHER PUBLICATIONS

U.S. Appl. No. 12/713,770, filed Feb. 26, 2010, Yoshino, Takashi.
Japanese Office Action dated Apr. 11, 2012.

*Primary Examiner* — Daniel Petkovsek
(74) *Attorney, Agent, or Firm* — Burr & Brown

(57) ABSTRACT

A wavelength conversion device has a supporting body, a wavelength conversion substrate, a lower side buffer layer provided on the side of a bottom face of the substrate, a upper side buffer layer provided on the side of a upper face of the substrate, and an adhesive layer adhering the supporting body 8 and the lower side buffer layer. The wavelength conversion substrate is made of a Z-plate of a ferroelectric single crystal and a periodic polarization inversion structure formed therein. The supporting body has a volume resistivity lower than that of the ferroelectric single crystal of the wavelength conversion substrate.

2 Claims, 3 Drawing Sheets

FOREIGN PATENT DOCUMENTS

| | | |
|---|---|---|
| JP | 2009-217009 A1 | 9/2009 |
| JP | 2009-217133 A1 | 9/2009 |
| WO | 2006/041172 A1 | 4/2006 |
| WO | 2007/046176 A1 | 4/2007 |
| WO | 2009/107473 A1 | 9/2009 |

* cited by examiner

US 8,294,978 B2

WAVELENGTH CONVERSION DEVICES AND A METHOD OF PRODUCING THE SAME

This application claims the benefit of Japanese Patent Application No. P2009-51527 filed on Mar. 5, 2009, the entirety of which is incorporated by reference.

BACKGROUND OF THE INVENTION

1. Technical Field of the Invention

The present invention relates to a wavelength conversion device and a method of producing the same.

2. Related Art

Non-linear optical crystals, such as lithium niobate and lithium tantalate single crystals, have a high secondary non-linear optical constant. A periodic polarization inversion configuration can be formed in the crystal to produce a Quasi-Phase-Matched (QPM) Secondary-Harmonic-Generation (SHG) device. Further, an optical waveguide may be formed in the periodic polarization inversion configuration to produce a high efficient SHG device, leading to a wide variety of applications in optical communication, medical, photochemical and various optical measurement fields.

According to Japanese patent publication No. 2005-55528A filed by the assignee, a semiconductor laser oscillating device of Fabri-Perro type is used to oscillate light, which is then irradiated into a slab-type optical waveguide made of a non-linear optical crystal as fundamental wave to output blue-ray laser from the slab optical waveguide. The slab-type optical waveguide is produced by polishing a Z-plate of the non-linear optical crystal such as lithium potassium niobate.

Further, according to WO 2009/107473 A1 (PCT/JP2009/052121) filed by the assignee, a wavelength-conversion substrate made of a Z-plate is bonded to a supporting body through an organic resin adhesive layer so that the burning of and air bubble generation in the adhesive layer can be prevented.

SUMMARY OF THE INVENTION

When a wavelength conversion device utilizing an optical waveguide is produced, it is necessary to optically polish the end face of the device and to form an anti-reflection film on the polished end face. For this, a plurality of the devices are stacked and held, and the end faces of the devices are then polished together at the same time.

As the inventor has tried to produce the device, however, micro cracks were observed in the region of the optical waveguide of the wavelength conversion substrate. The propagation loss of light may be thereby increased. The inventor then tried to study such device with the micro cracks to find the followings. That is, due to piezoelectric effect during the polishing, abnormal discharge is generated between the upper face of the wavelength conversion substrate of one device and the lower face of the supporting body of the adjacent device on the upper side in the stack. It is thus proved that the abnormal discharge induces the micro cracks in the optical waveguide. Such phenomenon has not been known in the art.

An object of the present invention is to provide a wavelength conversion device produce by adhering a supporting body and a wavelength conversion substrate made of a Z-plate of a ferroelectric single crystal with a periodic polarization inversion structure, so as to prevent the micro cracks in the optical waveguide due to pyroelectric effect caused by the polishing of the end face of the device and the resulting increase of the propagation loss.

The present invention provides a wavelength conversion device comprising:
  a supporting body;
  a wavelength conversion substrate comprising a Z-plate comprising a ferroelectric single crystal and a periodic polarization inversion structure formed therein;
  a lower side buffer layer provided on the side of a bottom face of the wavelength converting substrate;
  a upper side buffer layer provided on the side of a upper face of the wavelength conversion substrate; and
  an adhesive layer adhering the supporting body and the lower side buffer layer,
  wherein the supporting body has a volume resistivity lower than that of the ferroelectric single crystal of the wavelength conversion substrate.

The present invention further provides a wavelength conversion device comprising:
  a supporting body;
  a wavelength conversion substrate comprising a Z-plate comprising a ferroelectric single crystal and a periodic polarization inversion structure formed therein;
  a lower side buffer layer provided on the side of a bottom face of the wavelength conversion substrate;
  a upper side buffer layer provided on the side of a upper face of the wavelength conversion substrate;
  an adhesive layer adhering the supporting body and the lower side buffer layer; and
  a conductive film provided on the upper side buffer layer.

The present invention further provides a method of producing the wavelength conversion device, the method comprising the steps of;
  adhering the supporting body and the wavelength conversion substrate with the upper and lower side buffer layers to provide an adhered body; and
  polishing the end faces of the adhered bodies laminated with each other.

According to the present invention, the material of the supporting body adhered to the wavelength conversion substrate is made lower. During the polishing of the end face, the abnormal discharge can be thereby prevented between the upper face of the wavelength conversion substrate of one device and the lower face of the supporting body of the adjacent device thereon. It is thus proved that the micro cracks due to the discharge in the optical waveguide can be thereby prevented.

Further, according to the invention, the conductive film is formed on the buffer layer on the wavelength conversion substrate. During the polishing of the end face, the abnormal discharge can be thereby prevented between the upper face of the wavelength conversion substrate of one device and the lower face of the supporting body of the adjacent device thereon. It is thus proved that the micro cracks due to the discharge in the optical waveguide can be thereby prevented.

DETAILED DESCRIPTION OF THE INVENTION

Figure 1:
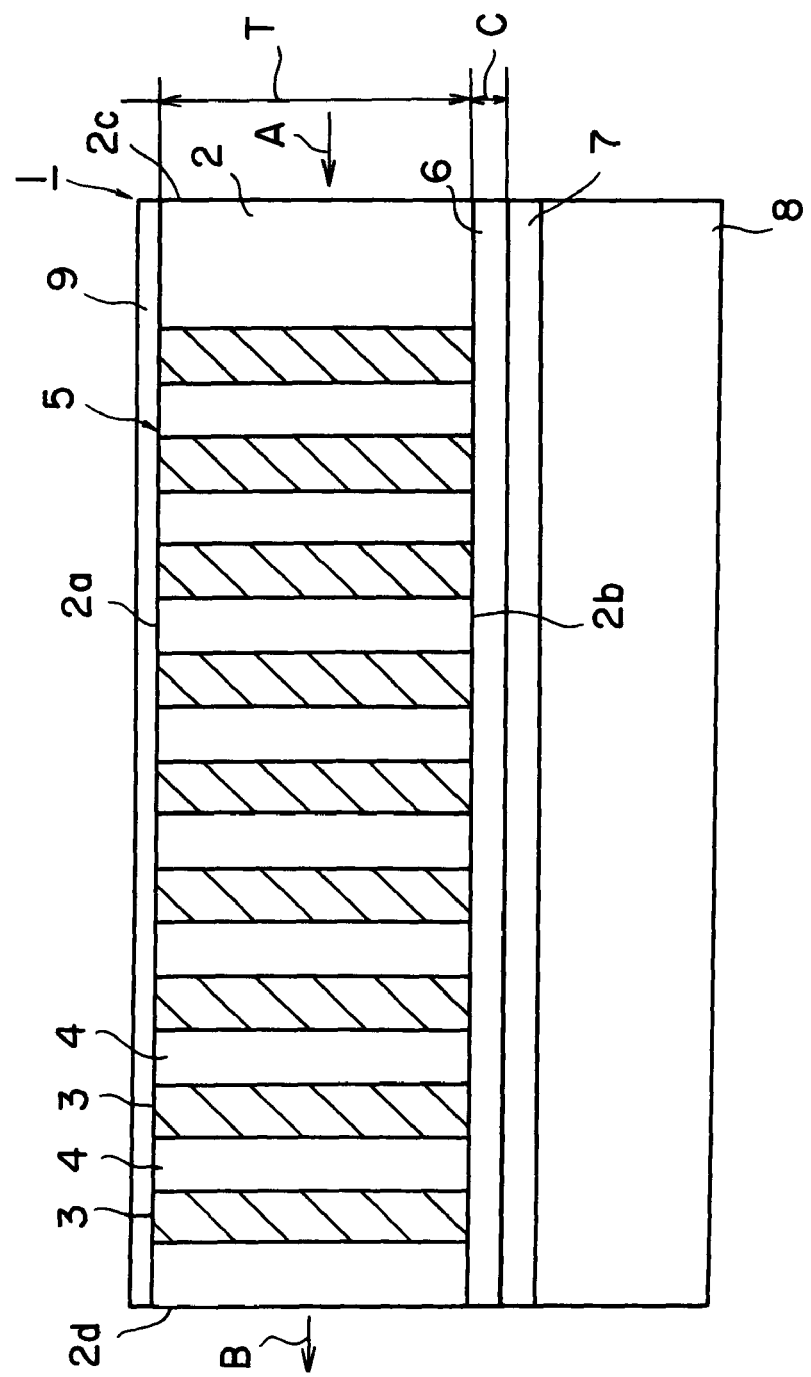
FIG. 1 is a diagram schematically showing a wavelength conversion device 1 according to an embodiment of the present invention.
Figure 2:
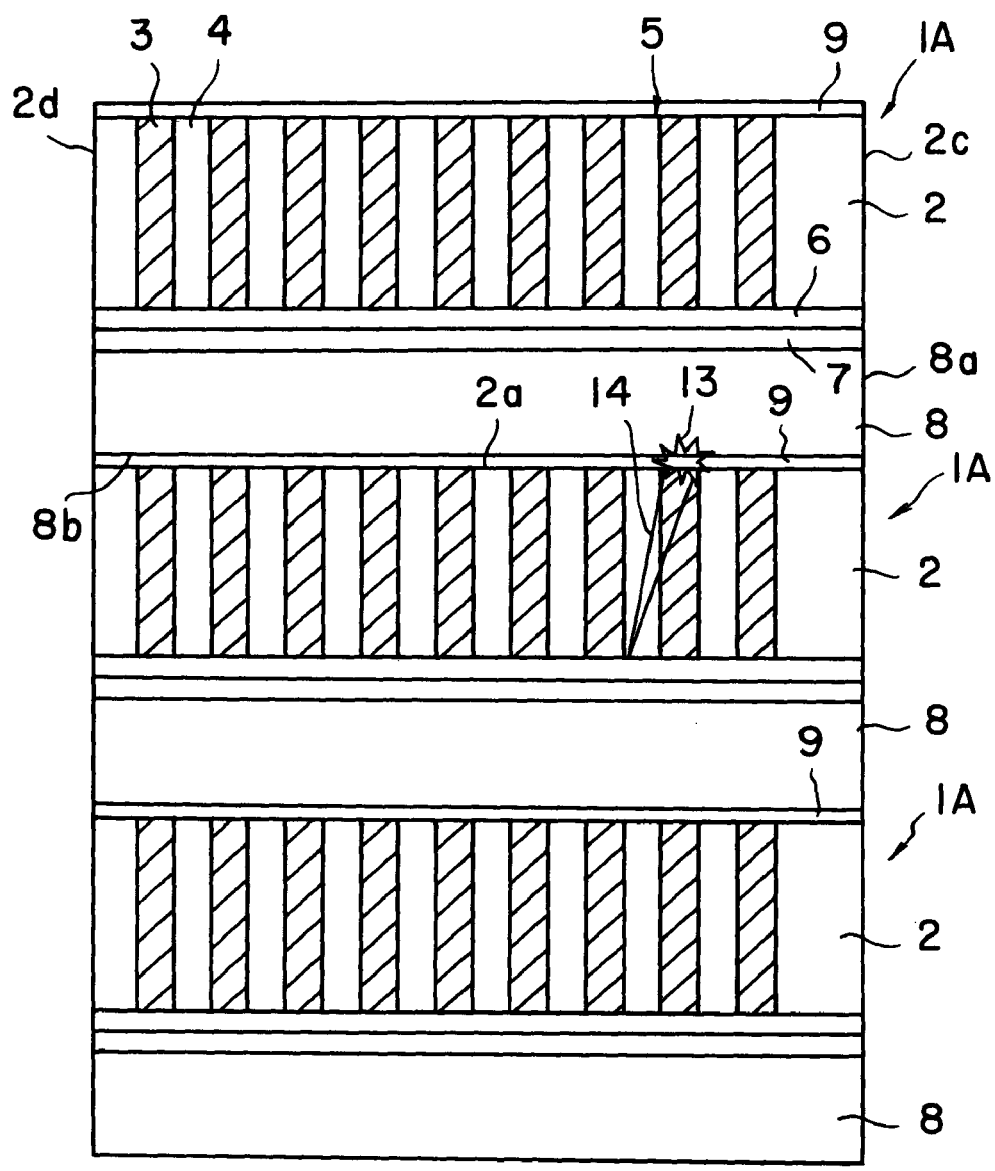
FIG. 2 is a diagram schematically showing a plurality of the devices of FIG. 1 laminated with each other.
Figure 3:
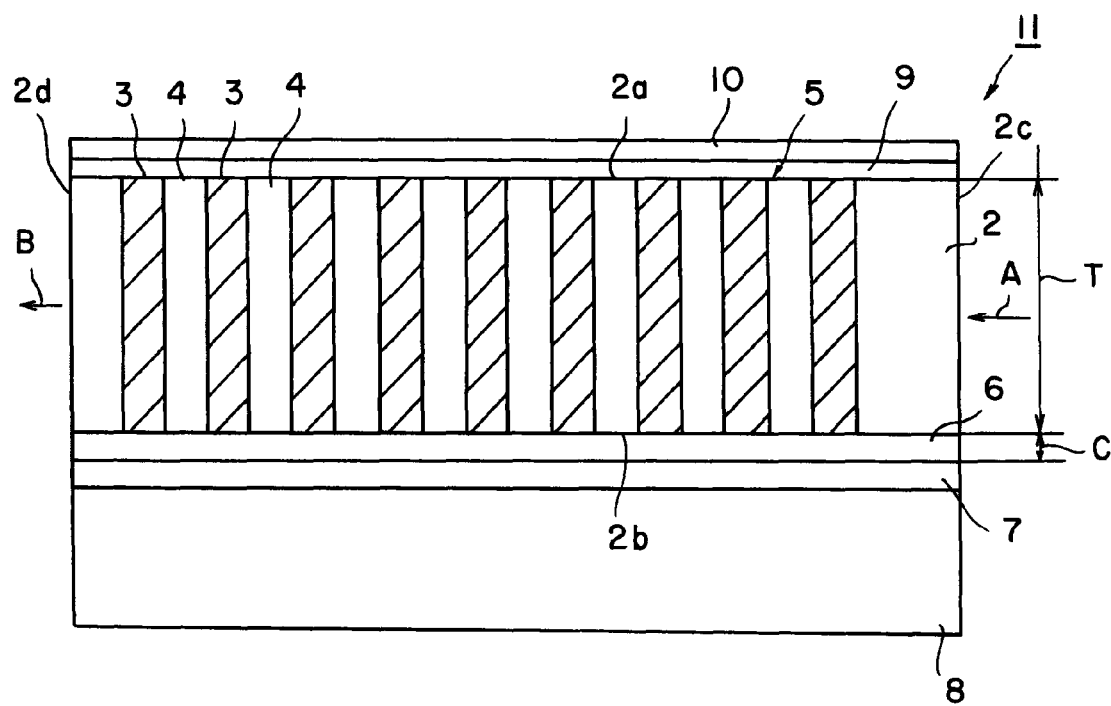
FIG. 3 is a diagram schematically showing a wavelength conversion device 11 according to another embodiment of the present invention.

According to the examples of FIGS. 1 to 3, in a Z-plate (wavelength conversion substrate) 2 made of a ferroelectric single crystal, polarization inversion parts 3 are provided from a upper face 2a toward a bottom face 2b at a predetermined interval. Z-plate means a plate where the poling occurs in the direction from the upper face toward the lower face of the plate. Non-polarization inversion parts 4 are left between the adjacent polarization inversion parts, respectively. The polarization inversion parts 3 and non-polarization inversion parts 4 are alternately formed at a predetermined period to provide a periodic polarization inversion structure 5.

A lower side buffer layer 6 is formed on a bottom face 2b, and a upper side buffer layer 9 is formed on a upper face 2a of the wavelength conversion substrate 2. According to the present example, the supporting body 8 is adhered to the bottom face of the lower side buffer layer 6 through an adhesion layer 7.

Fundamental wave is then irradiated into an incident face 2a as an arrow "A" from a light source not shown. The fundamental wave then propagates through the periodic domain inversion structure 5 to convert its wavelength, so that the converted light is then emitted from an emitting face 2d as an arrow "B". The wavelength of the converted light is determined by a polarization inversion period viewed in the direction of propagating light.

In production, the upper and lower side buffer layers are formed on the wavelength conversion substrate 2, to which the supporting body 8 is then adhered to obtain an adhered body 1A. In optically polishing the incident face 2c or emitting face 2d of the adhered body, as shown in FIG. 2, a plurality of the adhered bodies are laminated and held as an integrated body. The incident or emitting face of the laminated and integrated body is optically polished. In the optical polishing, it is preferred a method of coarsely grinding it on a metal surface plate using abrasives of diamond particles and of optically polishing the same then using abrasive of colloidal silica on a polyurethane surface plate.

The following problems were, however found. That is, the abnormal discharge 13 is caused due to the pyroelectricity generated between the upper face 2a of the wavelength conversion substrate 2 and the bottom face 8b of the supporting body 8 of the adjacent adhered body 1A, resulting in micro cracks 14 due to the abnormal discharge toward the inside of the optical waveguide. Such micro cracks result in a propagation loss within the optical waveguide.

According to the present invention, the resistivity of the material of the supporting body is made lower, so that the abnormal discharge and the resulting cracks and the increase of the propagation loss can be prevented.

Further, according to the present invention, as shown in FIG. 3, a conductive layer 10 is formed on the upper side buffer layer 9, so that the abnormal discharge and the resulting cracks and the increase of the propagation loss can be prevented.

Besides, if the wavelength conversion substrate 2 made of a ferroelectric single crystal is not a Z-plate and is X-plate, Y-plate or offset-X-plate, the abnormal discharge is not caused between the wavelength conversion substrate and supporting body, during the polishing of the end face. The propagation loss in the optical waveguide is not thereby observed in the first place. That is, the present invention is based on the discovery of the above described problems characteristic to the above specific structure. The present invention thus has an inventive step.

According to the present invention, the thickness "T" of the wavelength conversion substrate 2 (refer to FIGS. 1 and 3) may preferably be 10 μm or more and 100 μm or less. By increasing the thickness "T" to 10 μm or more, the fundamental wave can be easily irradiated into the waveguide to improve the connection efficiency of the fundamental wave. On the viewpoint, the thickness "T" of the wavelength conversion substrate 2 may more preferably be 20 μm or more.

Further, by making the thickness "T" of the wavelength conversion substrate 2 to 100 μm or less, the energy density of the guided light can be elevated to improve the conversion efficiency. On the viewpoint, the thickness "T" of the wavelength conversion substrate 2 may more preferably be 80 μm or less.

The ferroelectric material of the wavelength conversion substrate is not particularly limited, as long as it is capable of modulating light. The single crystal may be lithium niobate, lithium tantalate, lithium niobate-lithium tantalate solid solution, lithium potassium niobate, KTP, GaAs, quartz, $K_3Li_2Nb_5O_{15}$, $La_3Ga_5SiO_{14}$ and the like.

In order to further enhance the optical damage resistance of the optical waveguide, the ferroelectric single crystal may contain one or more metallic elements selected from the group consisting of magnesium (Mg), zinc (Zn), scandium (Sc) and indium (In), and magnesium is especially preferable. Further a rare earth element may be contained as a dopant into the ferroelectric single crystal. The rare earth element functions as an additive element for laser oscillation. As the rare earth element, Nd, Er, Tm, Ho, Dy and Pr are especially preferable.

According to a preferred embodiment, the volume resistivity of the supporting body is 1/100 or lower, and more preferably 1/500 or lower, of that of the single crystal forming the wavelength conversion substrate.

Further, according to a preferred embodiment, the volume resistivity of the supporting body is $1 \times 10^{12}$ Ω·cm or lower (more preferably $1 \times 10^{11}$ Ω·cm or lower). And the volume resistivity of the single crystal of the wavelength substrate is $2 \times 10^{12}$ Ω·cm or higher (more preferably $1 \times 10^{13}$ Ω·cm or higher).

According to a preferred embodiment, the supporting body is made of an oxygen deficient ferroelectric single crystal. For producing an oxygen deficient ferroelectric single crystal to lower the volume resistivity, the single crystal is heat treated under reducing atmosphere (preferably hydrogen atmosphere) preferably at 200 to 1000° C. It is further preferred that the reduction is performed at a pressure of $133 \times 10^{-1}$ to $133 \times 10^{-7}$ Pa.

Further, according to a preferred embodiment, the supporting body is made of a ferroelectric single crystal doped with iron. For doping iron atoms into the single crystal, an iron compound is added to the raw materials in growing the single crystal in advance. Such iron compound includes $Fe_2O_3$.

The method of producing the conductive film 10 on the upper side buffer layer is not limited and includes the followings.
(1) A metal thin film is produced by sputtering.
(2) A conductive paste is applied onto the buffer layer by printing or the like and fired.
(3) A conductive tape is adhered onto the buffer layer.

The material of the conductive film is not particularly limited, and includes a metal and a conductive paste. Specifically, Al, Ti, Ta, Cu, Ag and In series pastes.

The thickness of the conductive film is not particular limited, and preferably be 0.05 μm or larger and more preferably be 0.1 μm or larger, on the viewpoint of the invention. Further, on the viewpoint of reducing the optical absorption by the conductive film, the thickness of the conductive film is preferably 5 μm or smaller.

The conductive film may preferably cover 90 percent or more, and may cover the whole, of the surface of the upper side buffer layer.

Further, according to a preferred embodiment, the single crystal forming the wavelength conversion substrate is selected from the group consisting of lithium niobate, lithium tantalate and lithium niobate-lithium tantalate solid solution, and the lower resistance single crystal forming the supporting body is selected from the group consisting of lithium niobate, lithium tantalate and lithium niobate-lithium tantalate solid solution.

The volume resistivity of the material forming the wavelength conversion substrate may preferably be $1\times10^{14}$ Ω·cm or lower in a practical view. Further, the volume resistivity of the material forming the supporting body may preferably be $1\times10^{10}$ Ω·cm or higher in a practical view.

According to a preferred embodiment, a difference of the thermal expansion coefficient of the single crystal forming the wavelength conversion substrate and that of the supporting body is 10 percent or less of the thermal expansion coefficient of the single crystal forming the wavelength conversion substrate. By reducing the difference of thermal expansion coefficients, it is possible to prevent the fluctuation or reduction of the emission efficiency when subjected to thermal cycles or temperature change.

As the materials for the upper side and lower side buffer layers, silicon oxide, magnesium fluoride, silicon nitride, aluminum oxide and tantalum pentoxide may be listed as an example.

The thickness "c" of the upper side buffer layer and lower side buffer layer is not particularly limited. When the thickness "c" of the buffer layers is too small, however, the optical propagation loss is increased. On the viewpoint, the thickness "c" may preferably be 0.2 μm or larger. Further, when the thickness "c" of the buffer layers is too large, it becomes difficult to produce the buffer layer. On the viewpoint, the thickness "c" may preferably be 2.0 μm or smaller and more preferably be 1.5 μm or smaller.

The material of the adhesive layer for adhering the wavelength conversion substrate and supporting body may be an inorganic adhesive, an organic adhesive, or the combination thereof.

Although the organic adhesive is not particularly limited, and includes epoxy adhesive, acrylic adhesive, a thermosetting adhesive, ultraviolet curing adhesive, and ALON ceramics C (Trade name; supplied by Toa Gosei Ltd.; thermal expansion coefficient of $13\times10^{-6}$/K) having a thermal expansion coefficient relatively close to that of a material exhibiting electrooptic effect such as lithium niobate.

It is further preferred that the inorganic adhesive has a lower dielectric constant and an adhesion temperature (working temperature) of 600° C. or lower. Further, the adhesive preferably has a sufficiently high adhesion strength during the processing. Specifically, the adhesive includes a glass of a single component or a combination of plural components selected from the group consisting of silicon oxide, lead oxide, aluminum oxide, magnesium oxide, calcium oxide, boron oxide and the like. The other inorganic adhesive includes tantalum pentoxide, titanium oxide, niobium pentoxide and zinc oxide, for example.

The production method of the inorganic adhesion layer is not particularly limited, and includes sputtering, vapor deposition, spin coating, and sol-gel process. Further, a sheet of an adhesive may be interposed between the wavelength conversion substrate and supporting body to join them. Preferably, a sheet of a thermosetting resin, light curing resin or light thickening resin adhesive is interposed between the wavelength conversion substrate and supporting body and then cured. Such sheet may preferably be a film resin having a thickness of 10 μm or less.

EXAMPLES

Example 1

The second harmonic wave oscillating device illustrated in FIG. 1 was produced.

Specifically, a comb-shaped periodic electrode with a period of 7.0 μm was formed on an MgO 5% doped lithium niobate Z substrate of 0.5 mm thick by photolithography. The substrate has a volume resistivity of $5\times10^{13}$ Ω·cm. An electrode membrane was formed over the entire surface of the back face of the substrate. A pulse voltage was then applied on the electrodes to form the periodic domain polarization inversion structure 5. An $SiO_2$ under clad (buffer layer) 6 of a thickness of 0.6 μm was formed thereon by sputtering.

An adhesive was applied on a Z-cut low resistance lithium niobate substrate 8 of a thickness of 0.5 mm, which was then adhered to the above MgO-doped lithium niobate substrate. The substrate 8 had a volume resistivity of $5\times10^{10}$ Ω·cm. The thickness of the adhesive was 0.4 μm. The surface of the MgO-doped lithium niobate substrate was ground and polished to a thickness of 45 μm. An optical waveguide was formed on the thus obtained substrate 2, and an $SiO_2$ over clad (buffer layer) 9 of a thickness of 0.6 μm was formed thereon by sputtering.

The thus obtained adhered body was cut by a dicer to have a length of 5 mm and a width of 23 mm. The adhered body was fixed on a jig for polishing the end face. 20 of the adhered bodies were laminated and fixed on the jig. The end faces of the adhered bodies were polished with diamond abrasive and then by colloidal silica abrasive. Anti-reflection films were formed on both end faces, respectively, of each adhered body. Thereafter, the adhered body was cut into chips each having a width of 3.5 mm, and a slab optical waveguide was formed therein.

Nd-YAG laser was used in the optical waveguide to measure the optical characteristics of the chip. That is, the oscillation power of the laser was adjusted at 2 W to provide a fundamental light, which was incident into the slab optical waveguide through a lens. The fundamental light was scanned over a width of 3 mm and the distribution of the resulting SHG output was measured. It was thus proved that an SHG output power of 10 mW or more was observed over the whole scanned region.

Example 2

The second harmonic wave oscillating device 1 was produced according to the same procedure as the Example 1, and its end face was polished. However, the material of the supporting body 8 was a low resistance lithium niobate single crystal having a volume resistivity of $4\times10^{11}$ Ω·cm.

Nd-YAG laser was used in the optical waveguide to measure the optical characteristics of the chip. That is, the oscillation power of the laser was adjusted at 2 W to provide a fundamental light, which was incident into the slab optical waveguide through a lens. The fundamental light was scanned over a width of 3 mm and the distribution of the resulting SHG output was measured. It was thus proved that an SHG output power of 10 mW or more was observed over the whole scanned region.

Comparative Example 1

The second harmonic wave oscillating device 1 was produced according to the same procedure as the Example 1, and its end face was polished. However, the material of the supporting body 8 was conventional lithium niobate single crystal (volume resistivity of 1×10$^{14}$ Ω·cm), instead of the low resistance lithium niobate single crystal.

Nd-YAG laser was used in the optical waveguide to measure the optical characteristics of the chip. That is, the oscillation power of the laser was adjusted at 2 W to provide a fundamental light, which was incident into the slab optical waveguide through a lens. The fundamental light was scanned over a width of 3 mm and the distribution of the resulting SHG output was measured. It was thus proved that an SHG output power of less than 2 mW was observed at three observed regions.

As the result of observing the three regions with the low output power, it was proved traces of discharge 13 on the surface of the slab optical waveguide and cracks 14 inside of the waveguide.

Example 3

The second harmonic wave oscillating device 11 illustrated in FIG. 3 was produced.

Specifically, a comb-shaped periodic electrode with a period of 7.0 μm was formed on an MgO 5% doped lithium niobate Z substrate of 0.5 mm thick by photolithography. The substrate has a volume resistivity of 5×10$^{13}$ Ω·cm. An electrode membrane was formed over the entire surface of the back face of the substrate. A pulse voltage was then applied on the electrodes to form a periodic domain polarization inversion structure 5. An SiO$_2$ under clad (buffer layer) 6 of a thickness of 0.6 μm was formed thereon by sputtering.

An adhesive was applied on a lithium niobate substrate 8 of a thickness of 0.5 mm, which was then adhered to the above MgO-doped lithium niobate substrate. The substrate 8 had a volume resistivity of 1×10$^{14}$ Ω·cm. The thickness of the adhesive was 0.4 μm. The surface of the MgO-doped lithium niobate substrate was ground and polished to a thickness of 45 μm. An optical waveguide was formed on the thus obtained substrate 2, and an SiO2 over clad (buffer layer) 9 of a thickness of 0.6 μm was formed thereon by sputtering. Further, a conductive film 10 of a thickness of 0.5 μm made of Cr was formed on the over clad 9 by sputtering.

The thus obtained adhered body was cut by a dicer to have a length of 5 mm and a width of 23 mm. The adhered body was fixed on a jig for polishing the end face. 20 of the adhered bodies were laminated and fixed on the jig. The end faces of the adhered bodies were polished with diamond abrasive and then by colloidal silica abrasive. Anti-reflection films were formed on both end faces, respectively, of each adhered body. Thereafter, the adhered body was cut into chips each having a width of 3.5 mm, and a slab optical waveguide was formed therein.

Nd-YAG laser was used in the optical waveguide to measure the optical characteristics of the chip. That is, the oscillation power of the laser was adjusted at 2 W to provide a fundamental light, which was incident into the slab optical waveguide through a lens. The fundamental light was scanned over a width of 3 mm and the distribution of the resulting SHG output was measured. It was thus proved that an SHG output power of 10 mW or more was observed over the whole scanned region.

REFERENCE NUMERALS 1, 11 Wavelength conversion device, 2 Wavelength conversion substrate
3 Polarization inversion part 4 Non-inversion part
5 Periodic domain inversion structure 6 Lower side buffer layer
7 Adhesion layer 8 Supporting body
9 Upper side buffer layer 10 conductive film

The invention claimed is:

1. A wavelength conversion device comprising:
    a supporting body;
    a wavelength conversion substrate comprising a Z-plate comprising a ferroelectric single crystal and a periodic polarization inversion structure formed therein;
    a lower side buffer layer provided on the side of a bottom face of the wavelength converting substrate;
    an upper side buffer layer provided on the side of an upper face of the wavelength conversion substrate; and
    an adhesive layer adhering the supporting body and the lower side buffer layer,
    wherein the supporting body has a volume resistivity lower than that of the ferroelectric single crystal of the wavelength conversion substrate, and
    wherein said supporting body comprises an oxygen-deficient ferroelectric single crystal.

2. A wavelength conversion device comprising:
    a supporting body;
    a wavelength conversion substrate comprising a Z-plate comprising a ferroelectric single crystal and a periodic polarization inversion structure formed therein;
    a lower side buffer layer provided on the side of a bottom face of the wavelength converting substrate;
    an upper side buffer layer provided on the side of an upper face of the wavelength conversion substrate; and
    an adhesive layer adhering the supporting body and the lower side buffer layer,
    wherein the supporting body has a volume resistivity lower than that of the ferroelectric single crystal of the wavelength conversion substrate, and wherein said supporting body comprises an iron-doped ferroelectric single crystal.

* * * * *